United States Patent [19]

Silver et al.

[11] Patent Number: 4,783,576
[45] Date of Patent: Nov. 8, 1988

[54] HIGH VOLTAGE GAS FILLED PIPE TYPE CABLE

[75] Inventors: David A. Silver, Livingston; William G. Lawson, Summit, both of N.J.

[73] Assignee: Pirelli Cable Corporation, Union, N.J.

[21] Appl. No.: 103,826

[22] Filed: Oct. 1, 1987

[51] Int. Cl.⁴ .............................................. H01B 7/02
[52] U.S. Cl. ...................................... 174/25 R; 156/53; 156/56; 174/25 G; 174/25 P; 174/26 G
[58] Field of Search ............... 174/25 R, 25 G, 25 P, 174/25 C, 26 R, 26 G; 156/53, 56

[56] References Cited

U.S. PATENT DOCUMENTS

| | | | |
|---|---|---|---|
| 2,052,922 | 9/1936 | Dunsheath | 174/25 G |
| 2,082,649 | 6/1937 | Nageli | 174/25 G |
| 3,378,419 | 4/1968 | Eich et al. | 174/25 R |
| 3,459,871 | 8/1969 | Eager, Jr. et al. | 174/26 R |
| 3,621,110 | 11/1971 | McGrath | 174/25 R |
| 3,662,092 | 5/1972 | Franco | 174/25 R X |
| 3,916,078 | 10/1975 | Priaroggia | 174/25 R X |

FOREIGN PATENT DOCUMENTS 23678  2/1977  Japan ........................ 174/26 R

Primary Examiner—Morris H. Nimmo
Attorney, Agent, or Firm—Brooks Haidt Haffner & Delahunty

[57] ABSTRACT

A high voltage, gas filled, pipe type electrical cable and method of manufacture thereof. The cable comprises a plurality of insulated conductors, each conductor having a central gas passageway and being gas permeable. The conductor is wrapped with tapes impregnated with an insulating oil, and the wrapped tapes are encircled by gas permeable layers and skid wires. Three of such insulated conductors are encircled by a gas impermeable pipe, and the pipe and the conductor passageways are filled with an insulating gas under pressure above atmospheric pressure so that both the interior and exterior surfaces of the wrapped tapes are subjected to such gas. Preferably, the gas is a mixture of sulfur hexafluoride and nitrogen at a pressure of at least 200 psig. The tapes are impregnated with the oil and drained before they are wrapped around the conductor so as to provide gaps between the tapes which are substantially filled with the gas.

16 Claims, 3 Drawing Sheets

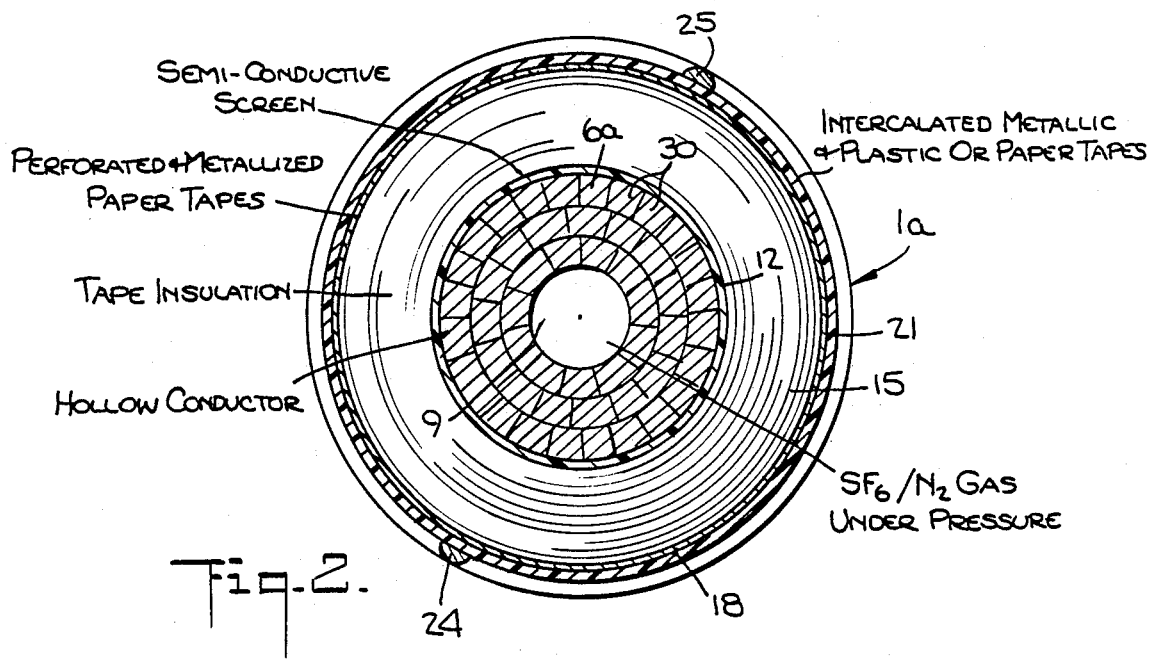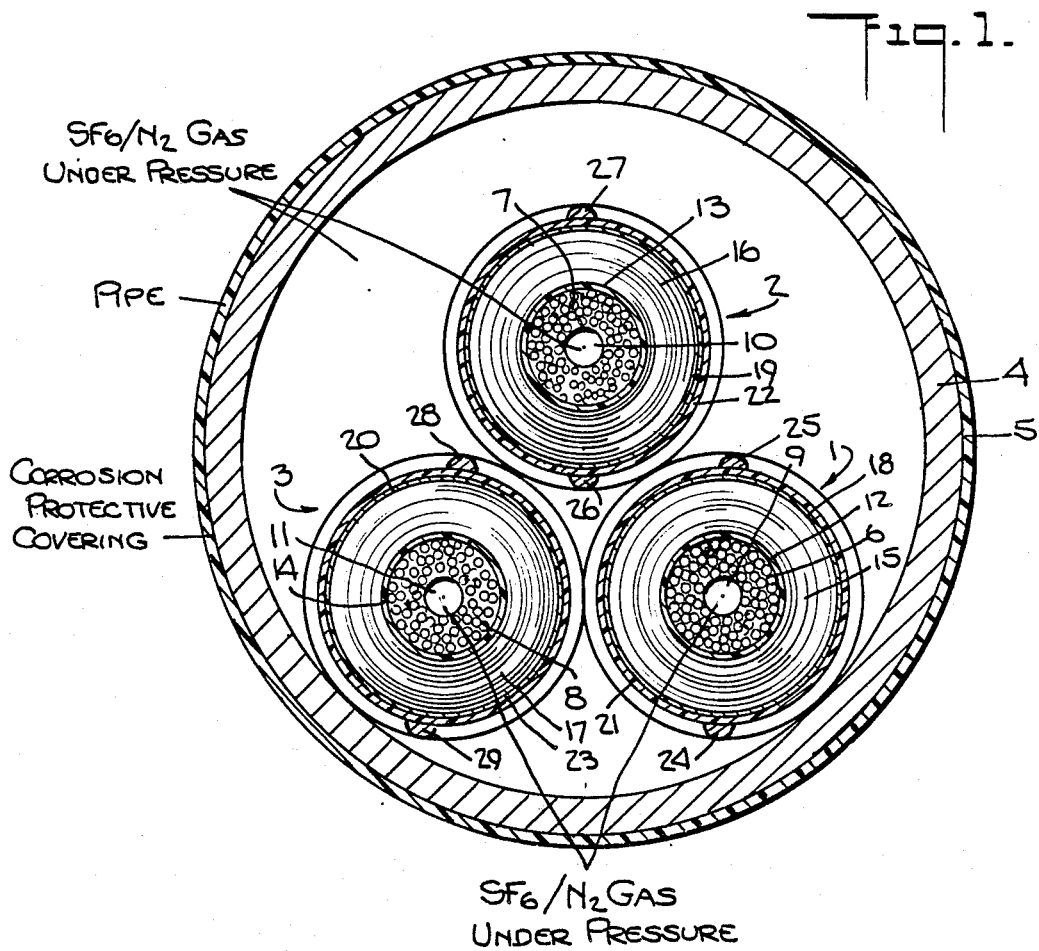

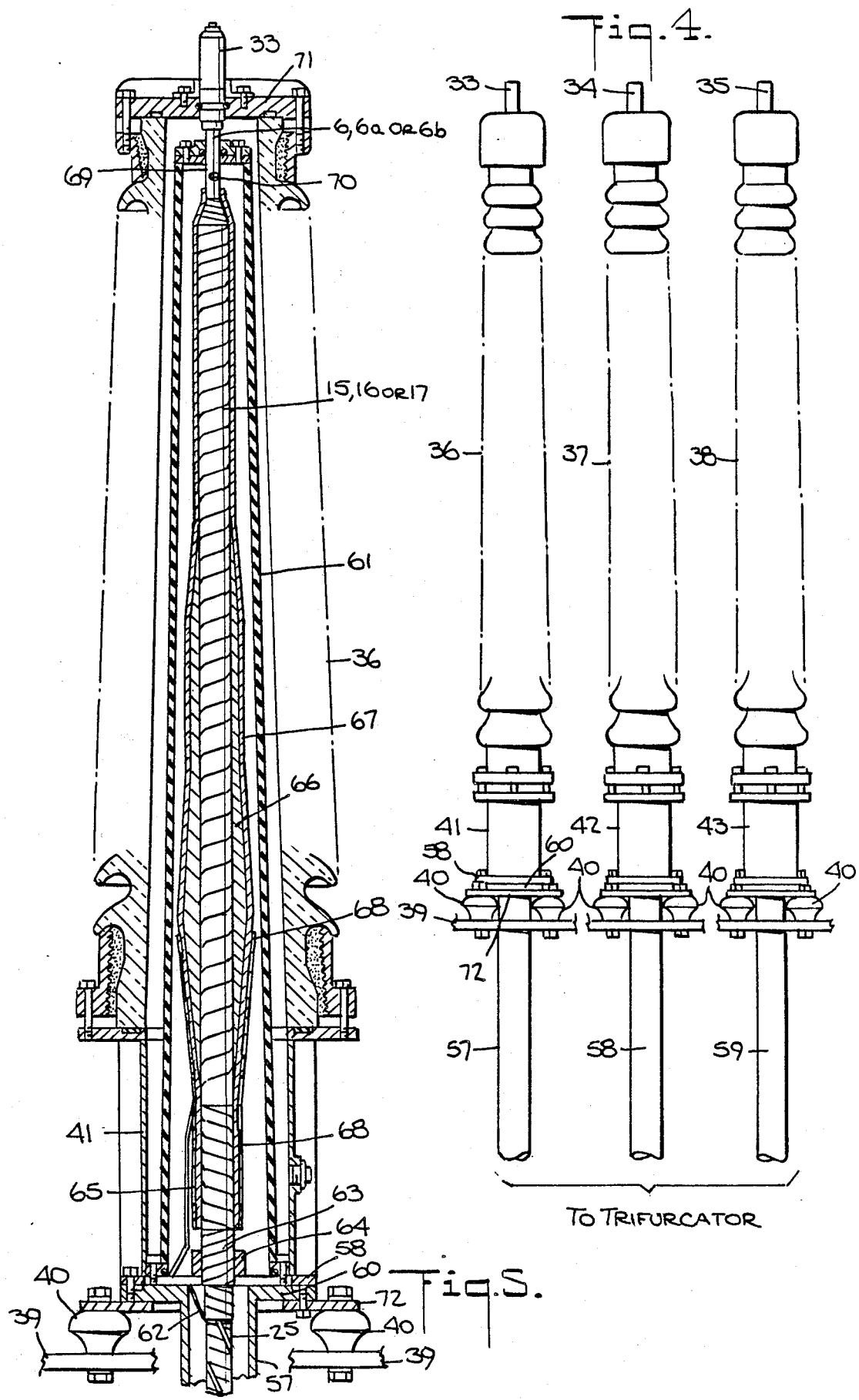

HIGH VOLTAGE GAS FILLED PIPE TYPE CABLE

This invention relates to high voltage electrical cables of the type used for electric power transmission and particularly, to cables of such type which are used underground or underwater and which have an outer pipe which contains gas under pressure above atmospheric pressure.

High pressure, oil filled (HPOF) pipe type cables are known in the art and have been found to be suitable for service operation at voltages at least as high as 345 kilovolts. Such cables have the tape insulation of the conductors impregnated with an insulating oil, such as polybutene synthetic oil or mineral oil having a viscosity of approximately 150 Saybolt Universal Seconds (SUS) at 210° F. and any gaps between the tapes are filled with such oil. Also, the pipe which surrounds the insulated conductors is filled with such oil, and the oil is maintained in the tape insulation and in the gaps under pressure by maintaining the oil in the pipe under a nominal pressure of 200 psig by means of an oil pumping plant connected to the installed cable.

High pressure gas filled (HPGF) pipe type cables are known in the art for voltage ratings up to 138 kV and comprise an outer steel pipe normally with three insulated conductors therein and otherwise filled with a gas, such as dry nitrogen under pressure of about 200 psig. Such cables have the conductors insulated with wound paper tapes impregnated with an insulating oil, predominantly polybutene having a viscosity of 3000 Saybolt Universal Seconds (SUS) at 210° F., around which there are shielding tapes, moisture barrier tapes and D-shaped skid wires which do not prevent the gas in the pipe from reaching the insulation.

Such HPGF cables are manufactured by applying the paper tapes by a lapping operation to each conductor and placing each conductor with the tape thereon in a vacuum tank where the tape insulation is heated and dried and where it is subsequently impregnated with an insulating oil at elevated temperature and pressure. Thereafter, the oil in the gaps of the taped insulation is partially drained in the tank at elevated temperature. Then, the so-insulated conductor is removed from the tank and the shielding tapes, moisture barrier tapes and D-shaped skid wires are applied.

Three of the insulated conductors with the additional layers applied as heretofore described are pulled into a steel pipe installed in the field. The pipe is evacuated and subsequently filled with a dry nitrogen gas at a nominal pressure of 200 psig. Pressurization is accomplished by means of pressurized nitrogen filled bottles equipped with regulators for controlling the pressure of the nitrogen gas in the pipe. The higher viscosity oil is used for high pressure gas filled pipe type cable to minimize drainage of the impregnating oil into the butt gaps of the helically applied paper tapes and into the gas filled pipe during operation of the cable system. The nitrogen gas under a pressure of 200 psig acts in a similar manner to the oil in high pressure oil filled cable to insure that the dielectric strength of the cable insulation exceeds the electrical stresses due to normal operating voltage and voltage transients. In a properly designed, manufactured and installed high pressure gas filled pipe type cable system, the pressurized gas in the butt gaps of the insulation structure will have sufficient dielectric strength under all conditions of operation to prevent electrical discharge, also termed ionization, which if permitted to occur would result in rapid deterioration of the insulation and cable failure.

HPGF pipe type cables have several advantages over HPOF cables when the voltage requirements are such that the former can be used, the most significant advantages being:

(1) A HPGF pipe type cable can be pressurized with gas from bottles, and the pressurization system may cost $15,000. A pumping plant for an HPOF pipe type cable may cost upwards of $100,000;

(2) Since the pressurization system for an HPGF pipe type cable is essentially passive (does not contain moving parts), it is of higher reliability and requires less maintenance than a pumping plant;

(3) Since the gas used in an HPGF pipe type cable is non-flammable whereas the oil used in an HPOF pipe type cable is flammable, an electrical failure in the latter cable can burn through the steel pipe and produce flaming oil in a tunnel where it is installed whereas a rupture in an HPGF pipe type cable would not;

(4) When there is a change in elevation of an installed HPOF pipe type cable, the pressure at the lower end of the cable will be the pressure at which the oil is maintained, e.g. 200 psig, plus the pressure attributed to the "head" of the oil which may require special steel pipe and terminations at the low end with a significant increase in cost;

(5) If the cable is buried underground, a small leak of the gas can usually be readily detected whereas a leak of the insulating oil may not; and (6) In underwater crossings, a gas leak is environmentally acceptable whereas an oil leak can be environmentally unacceptable.

However, HPGF pipe type cables with a service voltage rating above 138 kV have not been commercially available and, therefore, cannot be used in many installations where the HPOF pipe type cable can be used because of its higher service voltage rating, e.g. 345 kV.

Accordingly, it is apparent that it is desirable to provide an HPGF pipe type cable having a service voltage rating higher than 138 kV.

Although the prior art HPGF cables have been successfully used for voltages of up to 138 kilovolts, HPGF cables have not previously been developed and successfully tested for 230 kilovolt service. Experimental efforts have been made to increase the service rating by increasing the thickness of the 138 kilovolt insulation proportional to the increase in voltage so as to achieve the same electrical stress. However, such efforts were unsuccessful due to isolated areas of ionization in the gaps between the edges of the tapes of the insulation in the inner 15% of the thickness of the insulation. Some improvement was obtained experimentally by increasing the nitrogen gas pressure from 200 psig to 300 psig, but such expedient still did not make the cable acceptable for 230 kilovolt service.

A further effort was made to improve the voltage rating of the cable by impregnating the paper tapes with the insulating oil prior to applying the tape to the conductor rather than impregnating the tapes afte they had been apppplied to the conductor. In this process, the dried, slit-to-width paper tapes are impregnated with oil, and the excess oil is permitted to drain at elevated temperature prior to their being applied to the conductor in the lapping operation. With this process, no further drying or impregnation of the cable is required, and the amount of oil in the butt gaps of the paper tapes in the finished cable is significantly reduced. In this manner, further improvement in performance in the test program was accomplished. However, the performance was considered marginal and the mechanism of failure was the same. The cable also exhibited marginal performance on switching surge and impulse tests at withstand levels required for acceptance on 230 kV transmission systems. Furthermore, the increase of the insulation thickness to 1000 mils from the thickness of insulation used for the 138 kV cable, was considered detrimental to maintaining design pressure in the inner butt gaps of the insulation when pressuring from the outside and was also considered uneconomical from the standpoint of cost of cable manufacture, necessity for a larger size pipe, a larger quantity of nitrogen gas required to fill the pipe and associated costs.

One object of the invention is to provide an HPGF pipe type cable which is suitable for use in the field and which has a service voltage rating in excess of 138 kV and preferably, at least 230 kV.

Another object of the invention is to provide an HPGF pipe type cable with such improved service voltage rating without a substantial increase in the thickness in the insulation or in the pipe size.

In accordance with the invention, insulated conductors are placed within a pipe filled with a dry gas, preferably, a mixture of sulfur hexafluoride ($SF_6$) and nitrogen ($N_2$), under pressure. The conductors are insulated with layers of wound tapes, preferably cellulosic paper tape or composite tape which is a laminate of paper tape and polypropylene film, the wound tape having butt gaps between their edges. The tape is impregnated with an insulating oil, preferably a mineral oil (paraffinic or naphthenic), a synthetic oil (polybutene) or a blend of such oils, having an SUS viscosity in the range from 100 to 4000 at 210° F. but preferably, in the range from 2500 to 3500 at 210° F. The tape is impregnated with such oil and the oil is drained from the tape prior to winding it around the conductor. A gas channel is provided interiorly of the insulated conductor, such as centrally of the conductor, so that said gas under pressure may be applied to the insulation at its inner surface. The outer surface of the insulation is free of any covering which is impermeable to such gas. Thus, the gaps between the edge faces of the tapes are essentially without any insulating oil therein, but are filled with such gas under pressure, and gas under pressure, e.g. 200 psig and higher and preferably 300 psig, is applied to such insulation at both the exterior surface thereof and the interior surface thereof.

Other objects and advantages of the present invention will be apparent from the following detailed description of the presently preferred embodiments thereof, which description should be considered in connection with the accompanying drawings in which:

FIG. 1 is a transverse section of a HPGF pipe type cable of the invention;

FIG. 2 is an enlarged transverse section of an embodiment of an insulated conductor to be used in the HPGF pipe type cable of the invention;

FIG. 4 is an elevation view of three single phase riser pipes and terminators comprising a three phase terminal of a high pressure gas filled pipe type cable system; and FIG. 5 is an enlarged view, partly in section, of one of the terminators shown in FIG. 4.

Figure 3:
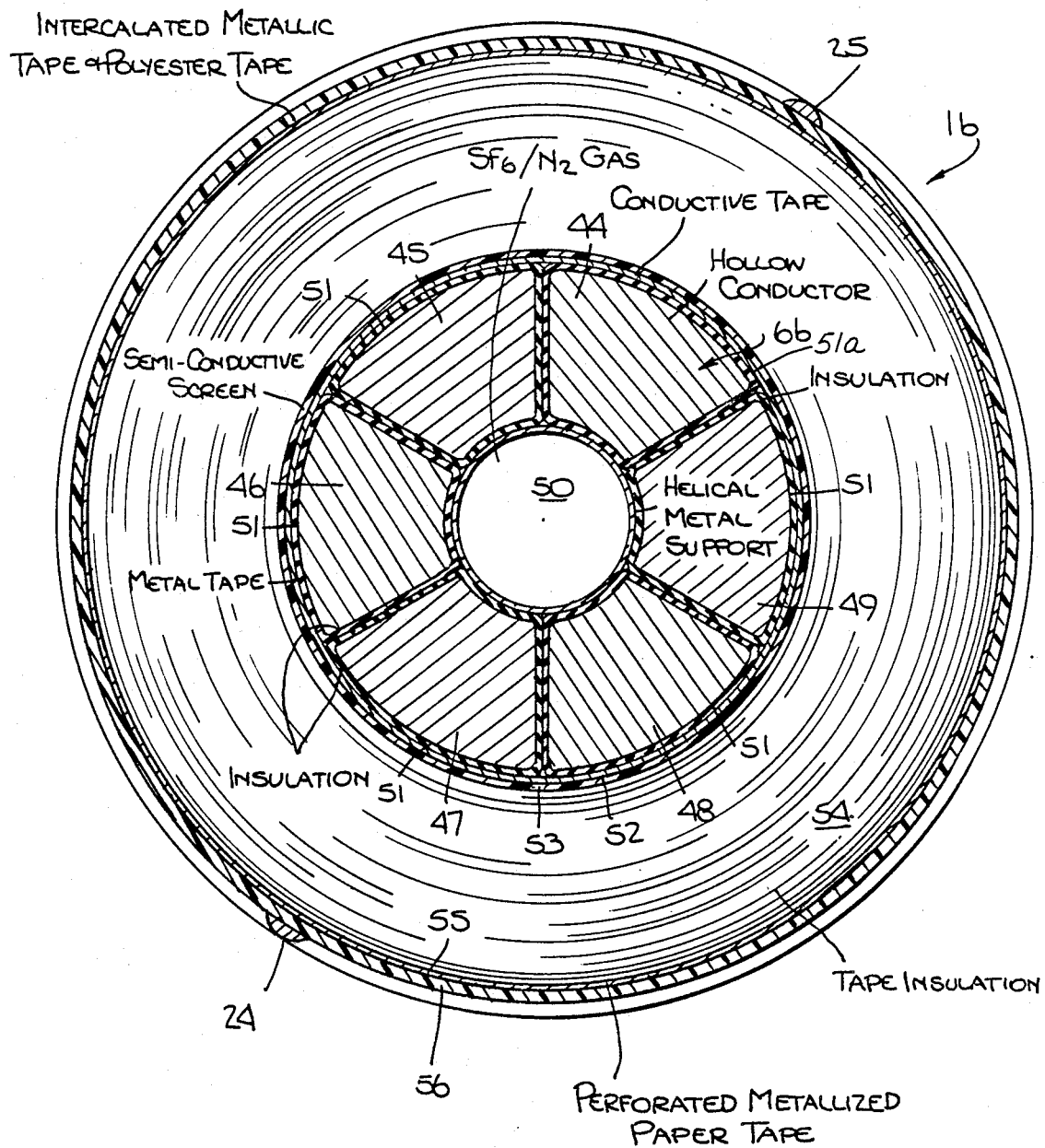
FIG. 3 is similar to FIG. 2 and illustrates another embodiment of an insulated conductor to be used in the HPGF cable of the invention.

An embodiment of the HPGF pipe type cable of the invention is illustrated in FIG. 1 in which three insulated conductors 1, 2 and 3 are within a gas tight metal pipe 4, such as a steel pipe, having a conventional corrosion protecting covering 5. The conductors 6, 7 and 8 can be any conventional type of gas permeable hollow conductor, and each conductor has a central gas duct 9, 10 and 11. Preferably, the conductors 6, 7 and 8 have the construction described hereinafter in connection with FIGS. 2 and 3.

Each conductor 6, 7 and 8, in FIG. 1 is surrounded by a semi-conductive screen, 12, 13 and 14, preferably formed by semi-conductive paper tapes, which is surrounded by layers 15, 16 and 17, of insulating tape with butt gaps, the tape preferably being wood pulp paper tape or laminated paper-propylene film-paper tap. The layers of insulating tape are surrounded by further shields 18, 19 and 20, preferably semi-conductive paper tapes plus perforated metallized paper tapes, which are surrounded by outer layers 21, 22 and 23, preferably layers of metallic tape intercalated with polyester tape. D-shape metal skid wires 24-29 are spirally wound in circumferentially spaced relation around the outer layers.

The ducts 9-11 and the space within the pipe 4 around the insulated conductors 1-3 are filled with a high dielectric gas under pressure. Preferably, the gas is a mixture of sulfur hexafluoride ($SF_6$) and nitrogen ($N_2$). The $SF_6$ content should be as high as possible limited by the lowest operating temperature of the cable system. The temperature at which the gas mixture will change state to a liquid is a function of the partial pressure of the $SF_6$ gas, and it is desirable that the gas not change to a liquid state under any temperature conditions which are likely to be encountered in service including a temporary de-energization of the circuit or outage during which the temperature of the cable could lower to ambient temperature. Depending on the voltage rating and the anticipated ambient temperature, the $SF_6$ gas can be omitted or be as high as 50% with the balance $N_2$ gas, but preferably, the $SF_6$ gas content is in the range from 5% to 25%. As an example, when the lowest expected ambient temperature is $-40°$ F., the cable is to be rated at 230 kilovolts and the preferred pressure is 300 psig, the preferred gas mixture is 15% $SF_6$ and 85% $N_2$.

Since the outer layers 21, 22 and 23 and the outer shields 18, 19 and 20 are gas permeable, the gas within the pipe 4 applies pressure to the insulating layers of tape 15, 16 and 17 and enters into any otherwise empty spaces within the insulating layers. Similarly, since the conductors 6, 7 and 8 and the inner semi-conductive screens 12, 13 and 14 are gas permeable, the gas in the ducts 9, 10 and 11 supply the gas under pressure to the interior of the insulating layers of tape 15, 16 and 17 and to any otherwise empty spaces within the insulating layers. In this way, all gaps in the insulating layers are maintained full of the gas under design pressure under all operating conditions so that there are no volumes of dielectric weakness in which electrical breakdown can occur. As a result, it is not necessary to increase the thickness of the layers of tape 15, 16 and 17 to the thickness of 1000 mils which is the proportionate thickness when adjusting from the 600 mils thickness for 138 kV HPGF cables to 230 kV and in fact, the thickness thereof may be even as small as or less than the thickness of 700-800 mils.

Although the cable of the invention will be described as having three insulated conductors in the pipe 4, it will be apparent that the number of insulated conductors may be larger or smaller. Normally, although not necessarily, each of the insulated conductors will have the same construction and the construction of two different types of insulated conductors 1a and 1b, will be described in greater detail in connection with FIGS. 2 and 3.

Although FIG. 1 illustrates stranded, round wire conductors 6, 7 and 8, one preferred embodiment of the conductors has self-supporting supporting keystone shaped wires 30 (Conci type) as shown in FIG. 2. The wires 30 may be copper or aluminum wires. The wire segments 30 are surrounded by semi-conductive screen 12.

In accordance with the invention, the tapes, i.e. the tapes for the insulation 15 and the screens 12 and 18, around the conductor 6a which can be impregnated, are impregnated, prior to being wrapped, with an insulating oil, such as a mineral oil (paraffinic or naphthenic), a synthetic oil (such as polybutene) or a blend of such oils, having an SUS viscosity in the range from about 100 to about 4000 at 210° F. but preferably, in the range from about 2500 to about 3500 at 210° F. After the tapes have been so impregnated, they are allowed to drain, to remove excess oil which could partially fill any gaps between windings, before the tapes are wound around the conductor 6a. Preferably, the winding is carried out so that the tape of one layer overlies and underlies the gaps in the next adjacent layers.

After all the various layers are wrapped around the conductor 6a and the skid wires 24 and 25 have been applied, the insulated conductor 1 and two similar insulated conductors 2 and 3 of FIG. 1 are drawn into the pipe 4 which is then sealed, the pipe is then evacuated and the gas under pressure is applied to the ducts 9, 10 and 11 and to the space within the pipe 4 and around the insulated conductors 1, 2 and 3. The pipe cable of the invention is then ready for operation.

An alternative preferred embodiment of the insulated conductors is illustrated in FIG. 3, and the insulated conductor 1b shown in FIG. 3 is constructed in substantially the same way as the insulated conductor 1a shown in FIG. 2 except for the manner in which the conductor 6b itself is formed, the conductor 6b being commonly known as a "Milliken" conductor.

The conductor 6b normally has six aluminum or copper segments 44-49 disposed around a helical metal support 50, and each of the segments 44-49, except for one segment 44, is wrapped with insulating tape 51, such as paper or polyester tape. The segment 44 is wrapped with semi-conductive paper tape 51a or metallized paper or polyester tape 51a. Any interstices at the outer periphery of the segments 44-49 are filled with a twisted paper or a polypropylene rope (not shown).

The segments 44-49 are secured in circular shape by a helical winding 52 of a metal tape, such as tape of copper, copper alloy, zinc or stainless steel, and the winding 52 is surrounded by a layer 53 of semi-conductive paper tapes which has been impregnated with insulating oil and drained before winding thereof in the manner described hereinbefore.

The layer 53 is surrounded by a plurality of layers 54 of insulating tape which have been impregnated with insulating oil and drained before winding thereof in the manner described hereinbefore. The tape for the layers 54 can be the paper or laminated paper-propylene film-paper tape described hereinbefore.

The insulating layers 54 are surrounded by layers 55 of semi-conductive impregnated paper tape plus perforated metallized tape, and the layers 55 are surrounded by layers 56 of intercalated metallic tape and polyester tape. Metal skid wires 24 and 25 are helically wound around the layers 56.

An HPGF cable containing insulated conductors 1b is prepared in the manner described in connection with the insulated conductors 1a.

The insulated conductors can be electrically terminated and supplied with the insulating gas under pressure as illustrated in FIGS. 4 and 5, FIG. 5 illustrating in enlarged section one of the terminators shown in FIG. 4.

The terminating apparatus shown in FIG. 4 comprises a plurality of electrically conductive, compression ferrules 33-35 secured in gas tight relation to the ends of the conductors of the insulated conductors, i.e. conductors 6, 7 and 8 or 6a or 6b. Porcelain insulators 36-38 extend from the top plate to which the ferrules 33-35 are secured to supporting metal tubes 41-43 which in turn are supported from a support structure 39 by a plurality of insulators 40. Metal riser pipes 57-59 extend through openings in the support structure and the mounting plate, the walls of the openings being spaced from the pipes 57-59, to a conventional trifurcator (not shown) for the insertion of the insulated conductors in the pipe 4 (FIG. 1).

FIG. 5 illustrates in greater detail one of the terminators, the left terminator, shown in FIG. 4. As shown in FIG. 5, the ferrule 33 is secured to a plate 71 in a gas tight manner which, in turn, is secured to the upper end of the porcelain insulator 36 in a conventional and gas tight manner.

At its lower end, the insulator 36 is secured to a flange on the upper end of supporting metal tube 41 in a conventional and gas tight manner. At its lower end, the tube 41 through its flange is secured to a flange 60 in a conventional and gas tight manner, and the flange 60 is welded to the riser pipe 57 in a gas tight manner. By way of the riser pipe 57, the interior of an epoxy-fiber-glass stop tube 61 is in gas communication with the interior of the pipe 4 (FIG. 1), the upper end of the stop tube 61 being secured to the conductor 6, 6a or 6b in a conventional and gas tight manner and the lower end of the stop tube 61 being secured to the flange 58 in a conventional and gas tight manner.

The skid wires 24 and 25 are conductively connected to the flange 58 by a conductive lead 62 which contacts the skid wires 24 and 25. The outer layer, 20, 21, 22 or 56, of the insulated conductor is covered by a layer of tape 63 within a centering collar 64 and is grounded to the flange 58 through a conductive lead 65. A stress cone 66 of a conventional type and having an outer layer 67 of insulation and layers 68 of shielding braid and binders cover the insulated conductor intermediate the collar 64.

The exposed conductor end portion 69, has an opening 70 therethrough which permits gas within the stop tube 61 to enter into the central gas duct, e.g. 9, 10 or 11, of the insulated conductor. Therefore, the gas under pressure within the pipe 4 is also present in the gas ducts of the conductors. The gas under pressure is supplied to the interior of the pipe 4 in a conventional manner.

From the foregoing description of preferred embodiments of the invention, it is apparent that the HPGF pipe type cables of the invention have oil impregnated insulation and that any gaps therein are substantially filled with a gas under pressure, preferably, a mixture of $SF_6/N_2$ gas at a pressure of at least 200 psig and preferably, at a pressure of 300 psig when the cable is used at voltages of 230 Kv. Furthermore, during use, the insulation is subjected to such gas under pressure at both the interior and exterior surfaces thereof so that with thermal cycles, there is substantially no depletion or significant pressure reduction of the gas in any gaps in the insulation whether the gaps are located at the radially outer portion or the radially inner portion of the insulation. In this way, ionization and disruptive discharges in the gaps are avoided.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A high voltage electrical cable comprising:
   an insulated conductor comprising a conductor encircled by a plurality of overlapping layers of insulating tape impregnated with an insulating oil, a gas passageway inside the inner surface of said layers of tape and an insulating gas under pressure above atmospheric pressure in said passageway, said insulated conductor being free of a gas impermeable layer intermediate said gas passageway and said inner surface of said layers of tape and exteriorly of the outer surface of said layers of tape;
   a gas impermeable pipe having an interior surface cross-sectional dimension greater than the cross-sectional dimension of the exterior surface of said insulated conductor to provide a gas receiving space between said interior surface of said pipe and said exterior surface of said insulated conductor; and
   an insulating gas under a pressure of at least 200 psig in said space;
   whereby insulating gas under pressure is applied to said layers of insulating tape at both the interior and exterior surfaces thereof.

2. A high voltage electrical cable as set forth in claim 1 wherein said layers of insulating tape have gaps therein which are substantially filled by said gas.

3. A high voltage electrical cable as set forth in claim 1 wherein said gas is a mixture of sulfurhexafluoride and nitrogen gases under a pressure of at least 200 psig.

4. A high voltage electrical cable as set forth in claim 3 wherein the mixture of gases is a mixture of about 5% to about 25% sulfurhexafluoride and the balance, nitrogen, wherein the gas pressure is at least 300 psig and wherein said insulating oil has a Saybolt Universal viscosity in the range from about 100 to about 4000 seconds at 210° F.

5. A high voltage electrical cable as set forth in claim 4 wherein the mixture of gases is a mixture of 15% sulfurhexafluoride and 85% nitrogen and said insulating oil has a Saybolt Universal viscosity in the range from about 2500 to about 3500 seconds at 210° F.

6. A high voltage electrical cable as set forth in claim 4 wherein said insulating oil is selected from the group consisting of mineral oils and synthetic oils and mixtures thereof.

7. A high voltage electrical cable as set forth in claim 1 wherein said conductor is gas permeable and said gas passageway is disposed centrally of said conductor and extends axially thereof.

8. A high voltage electrical cable as set forth in claim 7 wherein said conductor comprises a plurality of keystone shaped segments disposed around said gas passageway.

9. A high voltage electrical cable as set forth in claim 8 further comprising at least a first gas permeable, semi-conductive screen intermediate said conductor and said layers of insulating tapes and at least a second gas permeable, semi-conductive, screen around said layers of insulating tapes.

10. A high voltage electrical cable as set forth in claim 9 further comprising a gas permeable layer of tapes around said second gas permeable screen and at least one skid wire around said gas permeable layer of tapes.

11. A high voltage electrical cable as set forth in claim 10 wherein the said gas permeable layer of tapes includes metal tapes.

12. A high voltage cable as set forth in claim 1 wherein the gas in said passageway and the gas in said space are under substantially the same pressure.

13. A method of manufacturing a high pressure, gas filled pipe type electrical cable which comprises:
   impregnating insulating tape with an insulating oil and permitting such tape to drain to remove excess oil;
   wrapping said insulating tape around a gas permeable tubular conductor in a plurality of overlapping layers;
   wrapping further layers of tape around the wrapped said insulating tape;
   inserting a plurality of so-wrapped conductors in a gas impermeable pipe without a gas impermeable layer therearound; and
   supplying an insulating gas under pressure above atmospheric pressure to both the interior of said pipe and to the bore of said tubular conductor.

14. A method as set forth in claim 13 wherein said insulating gas is supplied at a pressure of at least 200 psig.

15. A method as set forth in claim 13 wherein said insulating gas is supplied at a pressure of at least 300 psig.

16. A method as set forth in claim 15 wherein said gas is a mixture of sulfurhexafluoride gas and nitrogen, the sulfurhexafluoride gas constituting about 5% to about 25% of the mixture and wherein said insulating oil has a Saybolt Universal viscosity in the range from about 100 to about 400 seconds at 20° F.

* * * * *

UNITED STATES PATENT AND TRADEMARK OFFICE
CERTIFICATE OF CORRECTION

PATENT NO. : 4,783,576
DATED : November 8, 1988
INVENTOR(S) : David A. Silver et al It is certified that error appears in the above-identified patent and that said Letters Patent is hereby corrected as shown below:

Col. 2, line 62, "afte" should read --after--;
    Col. 4, line 18, "tap" should read --tape--;
    Col. 5, line 14, "supporting" (second occurrence) should be deleted.

Signed and Sealed this

Second Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,783,576
DATED : November 8, 1988
INVENTOR(S) : Silver et al

It is certified that error appears in the above-identified patent and that said Letters Patent is hereby corrected as shown below:

Col. 8, line 61, change "400" to --4000--- and change "20" to --210--.

Signed and Sealed this

Twenty-ninth Day of June, 1993

Attest:

MICHAEL K. KIRK

Attesting Officer  Acting Commissioner of Patents and Trademarks